Figure 1:
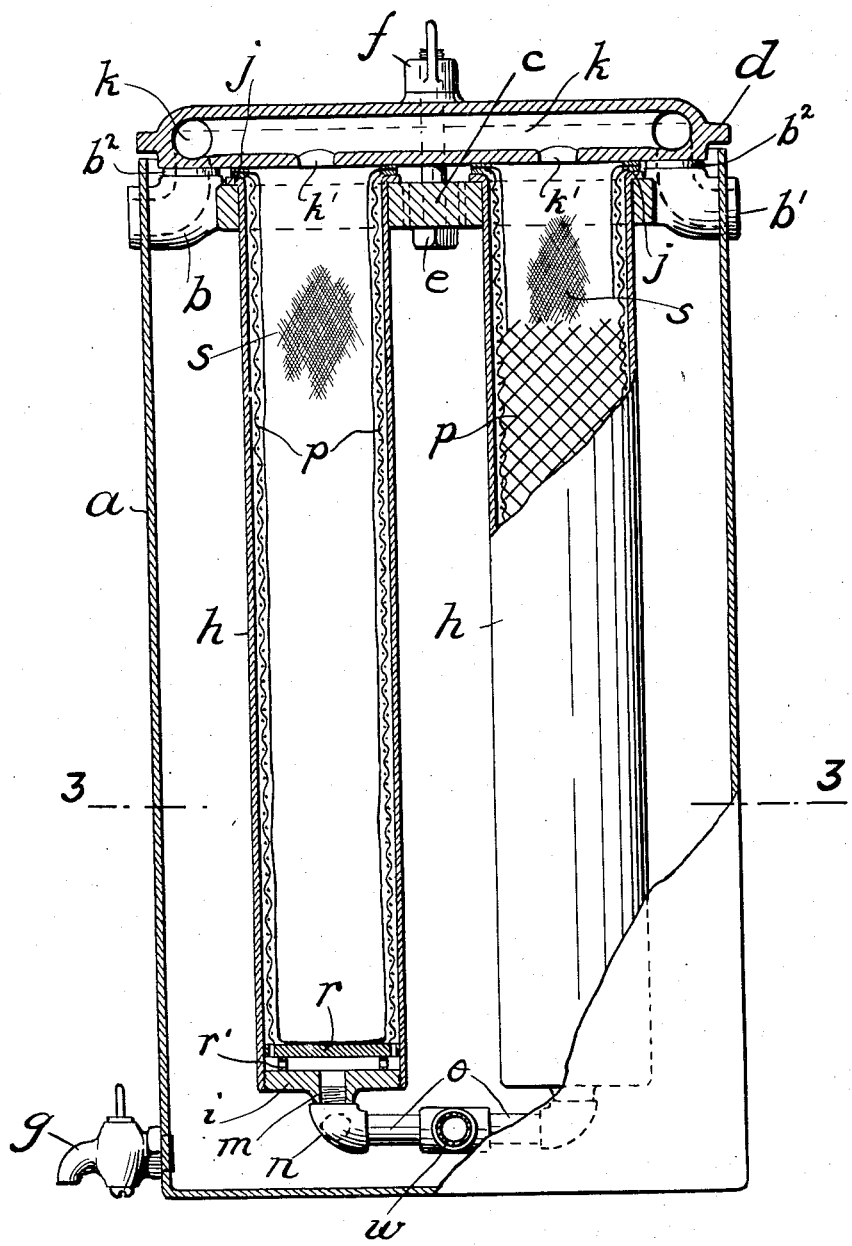

June 23, 1931.  A. HOPKINS  1,810,965
FILTER
Filed April 9, 1929    2 Sheets-Sheet 1

WITNESS:

INVENTOR
Alfred Hopkins
BY
ATTORNEYS.

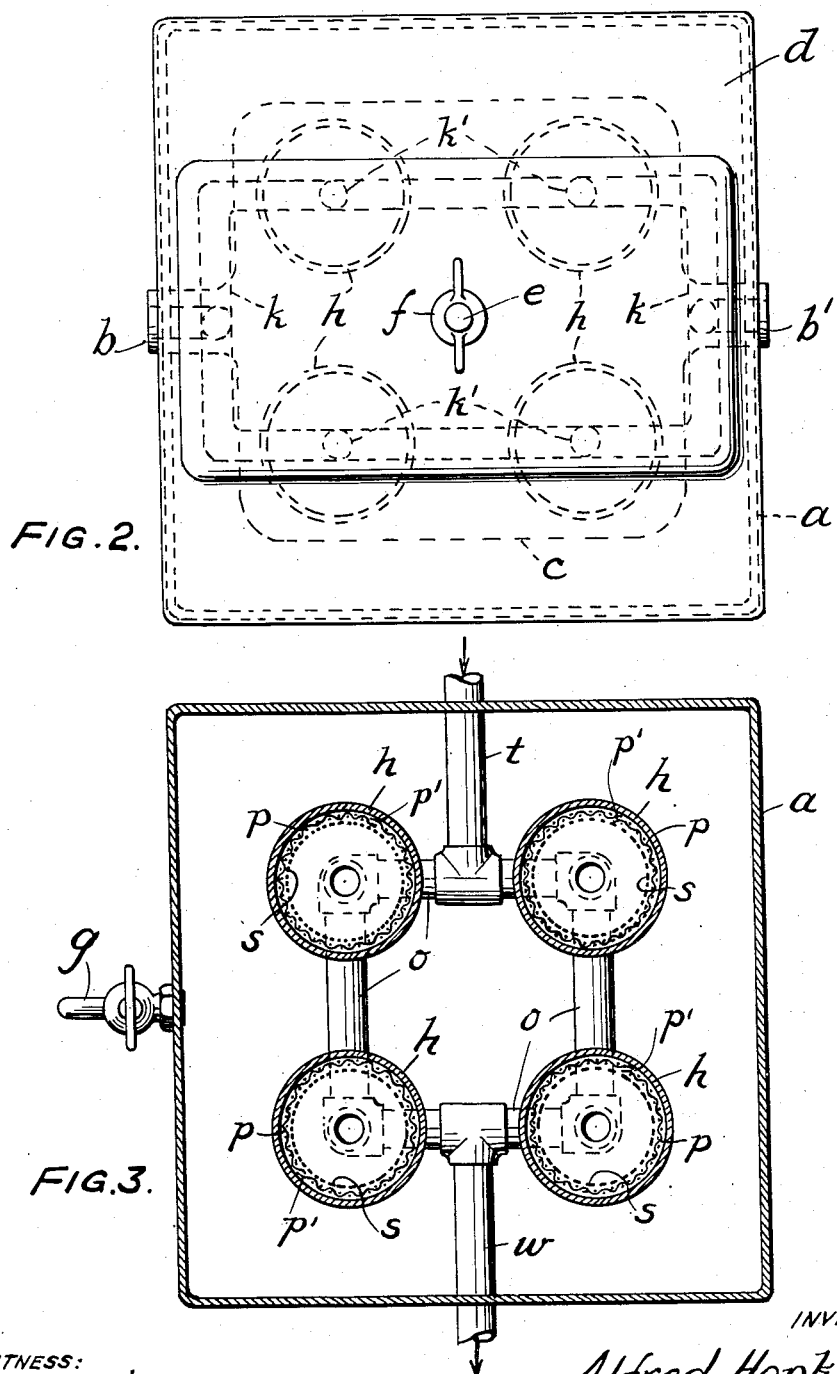

Patented June 23, 1931

1,810,965

UNITED STATES PATENT OFFICE

ALFRED HOPKINS, OF PHILADELPHIA, PENNSYLVANIA, ASSIGNOR TO HOPKINS-TULL MACHINERY COMPANY, OF PHILADELPHIA, PENNSYLVANIA, A CORPORATION OF PENNSYLVANIA

FILTER

Application filed April 9, 1929. Serial No. 353,844.

The object of my invention is to provide an efficient filtration plant. It comprises novel means for constructing the individual filters, novel means for supporting and arranging a number of individual filters in association as a filter unit, and novel means for flowing liquid through the supporting means and in multiple through the individual filters and for flowing filtered liquid from the individual filters to a common outflow pipe. The construction and arrangement of inflow and outflow passages are such as to allow any desired number of filter units to be assembled together to form a filter plant of any desired size and to provide for flow of liquid from a common source in multiple through the various individual filters of the various filter units and from the various individual filters of the various filter units to a common point of delivery.

The filter is adapted to the purification of any liquid which is filterable through fabrics, such as, for example, oil containing carbon or other solid particles, solvent containing dirt or other solid particles, pharmaceutical liquids containing suspensions of solid matter, used or impure bleaching agents, etc.

In the drawings, which illustrate one filter unit,—

Fig. 1 is an elevational view, mostly sectional. Fig. 2 is a plan view. Fig. 3 is a cross-section on the line 3—3 of Fig. 1.

To a casing $a$, preferably of rectangular shape in cross-section, are secured diametrically opposite elbows $b$, $b'$, which extend inward and support between them a rectangular plate $c$. On the elbows $b$, $b'$, is supported a casing head $d$. Extending down through head $d$ and plate $c$ is a bolt $e$, on which is a nut $f$ which is tightened to hold head $d$ firmly in place on plate $c$, or rather upon elbows $b$, $b'$ thereof with the interposition of washers $b^2$ therebetween.

Plate $c$ is provided with four holes for the reception of filter containers. Each container comprises a tubular or cylindrical body $h$ and a bottom plate $i$. The body of container $h$ is provided at the top with an outwardly extending annular flange $j$ which rests on that part of the upper face of plate $c$ which is marginally adjacent to the corresponding hole. Preferably, the tubular body $h$ is made of seamless steel and top flanges $j$ are spun over the plate $c$.

Plate $c$ is provided with an internal passage $k$, with holes whereby passage $k$ communicates with passages in elbows $b$ and $b'$, and with other holes $k'$ positioned centrally over the filter containers $h$. The bottom plate $i$ of each container has an exit nozzle $m$, carrying an elbow $n$. The elbows $n$ of adjacent containers are connected by pipes $o$.

Inserted in each container $h$ is a tubular shaped screen $p$, and within screen $p$ is an open top bag $s$ of porous material, which may be of cotton duck or other material adapted to allow the escape therethrough of the liquid and retain the solid matter. The screen $p$ may be made of wire mesh and may be made of rectangular form and then bent into tubular form, with the ends overlapping (as shown at $p'$, Fig. 3) before insertion into the container. Below screen $p$ is a bottom perforated plate $r$. The bottom of the container, or the plate $r$, carries a spacing member or members, such as a perforated ring $r'$, which supports the plate $r$ in spaced relation to the bottom $i$ of the container.

The casing $a$ is mainly a supporting member for the rest of the apparatus, but it also acts to receive any leaking liquid and is therefrom provided with a valve controlled drain outlet $g$.

The liquid to be filtered flows through the passage in elbow $b$ and thence around passage $k$, a portion of the liquid escaping through each hole $k'$ into the filter bag $s$ immediately below it. The filtrate escapes through the meshes of bag $s$ into the annular space between the bag and the tubular container body $h$, thence through the perforations in plate $r$ and ring $r'$, and thence through nozzles $m$ into pipes $o$.

The casing $a$ and the filters and other devices supported therein and thereon constitute what may be called, for convenience, a filter unit. Elbow $b$ may be assumed to communicate with unfiltered liquid which has flowed through the passage $k$ of another similar unit (not shown) and has not escaped into the filtering devices thereof, while elbow $b'$ may be assumed to communicate with an elbow $b$ of a third filter unit (not shown) and into which is carried unfiltered liquid which has not escaped into the filtering devices of the unit illustrated.

Certain of the pipes $o$ communicate respectively with pipes $t$ and $w$, one of which, $t$, may be assumed to be an outlet for filtered liquid from one of the pipes $o$ of a fourth filter unit (not shown), while the other of which, $w$, may be assumed to be an outlet from one of the pipes $o$ of the unit shown and to communicate with one of the pipes $o$ of a fifth filter unit (not shown).

Thus, the filters of each unit are arranged in parallel or multiple, and different units are also arranged in parallel or multiple; so that a filtering plant of any desired capacity may be erected and all the units fed from a common source and delivered to a common point of delivery.

Without the screen $p$, or some equivalent, the bag $s$ would be distended by the liquid and press against the tubular body $h$ and prevent outflow of liquid. The screen acts to maintain the bag $s$ spaced from the container wall. The bag, however, interlocks with the meshes of the screen, and when it is desired to clean the filter, the bag and screen are removed together. On re-insertion, the screen is first placed in the container and then the bag is pushed down into the screen.

Having now fully described my invention, what I claim and desire to protect by Letters Patent is:

A filter comprising a casing, a plate supported across the upper part thereof, members secured to the casing and plate and through which liquid to be filtered is adapted to respectively inflow and outflow, a casing head above said plate provided with a passage communicating with the flow passages in said members, filter containers aligning with holes in said plate and depending from and supported by said plate, a filter bag within each container, and means for outflow of unfiltered liquid from the passage in said plate through said holes to the respective filter containers.

In testimony of which invention, I have hereunto set my hand, at Philadelphia, Pennsylvania, on this 28th day of January, 1929.

ALFRED HOPKINS.